UNITED STATES PATENT OFFICE.

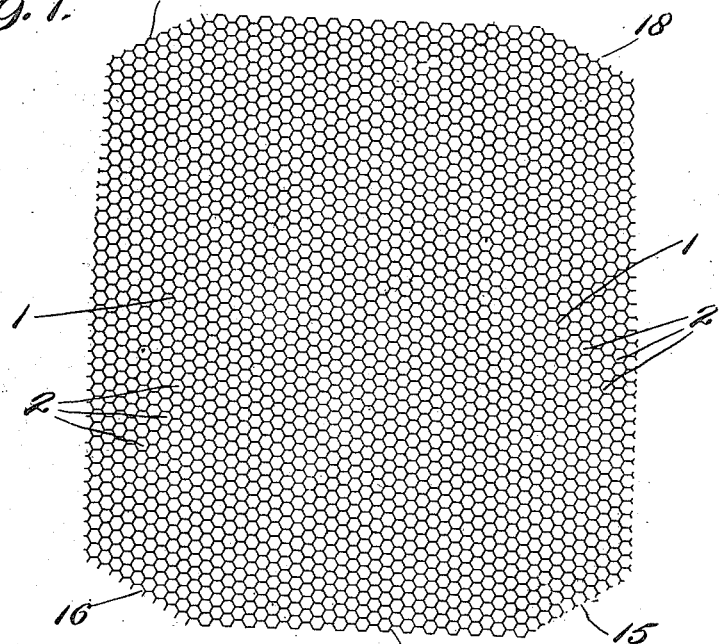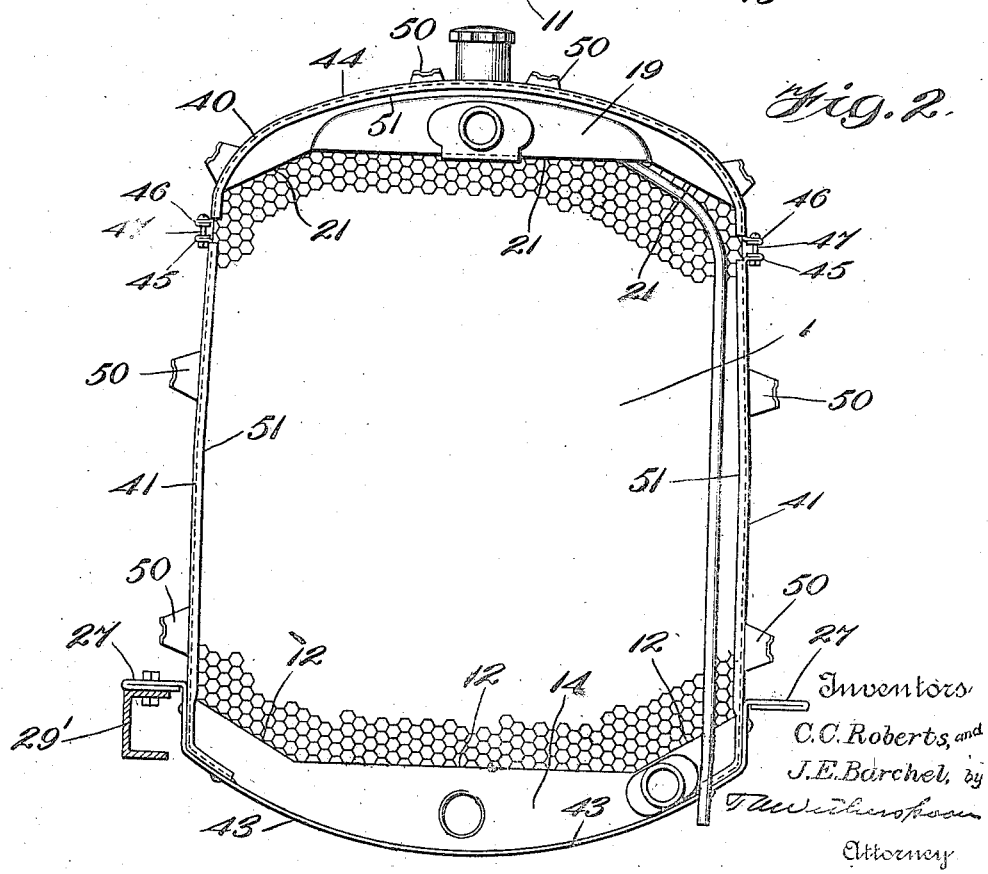

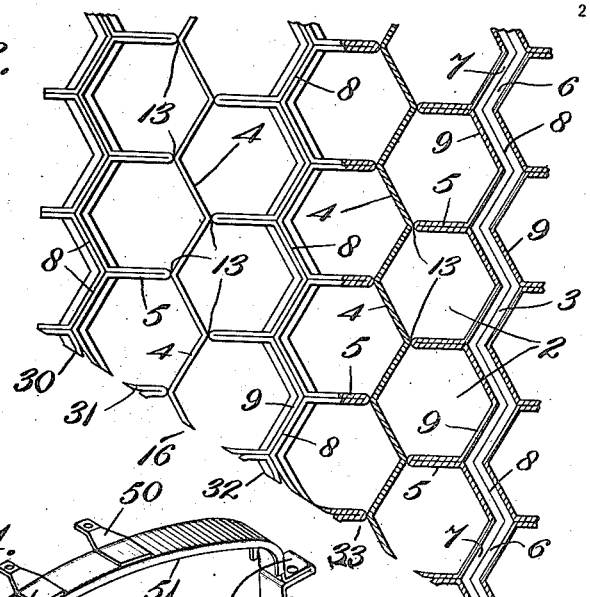

CHARLES CHRISTOPHER ROBERTS AND JOHN EDWARD BARCHEL, OF LOCKPORT, NEW YORK, ASSIGNORS TO HARRISON MANUFACTURING COMPANY, OF LOCKPORT, NEW YORK, A CORPORATION OF NEW YORK.

SUSPENSION FOR RADIATOR-CORES.

1,238,943.   Specification of Letters Patent.   Patented Sept. 4, 1917.

Application filed September 21, 1916. Serial No. 121,485.

*To all whom it may concern:*

Be it known that we, CHARLES CHRISTOPHER ROBERTS and JOHN EDWARD BARCHEL, both citizens of the United States, both residing at Lockport, in the county of Niagara and State of New York, have invented certain new and useful Improvements in Suspensions for Radiator-Cores; and we do hereby declare the following to be a full, clear, and exact description of the invention, such as will enable others skilled in the art to which it appertains to make and use the same.

This invention relates to a suspension for radiator cores especially adapted for automobiles and other vehicles, and has for one of its objects to provide a means of this nature which will avoid, to a large extent, the injurious racking strains that are transmitted to radiator cores by the suspensions heretofore proposed.

With this and other objects in view the invention consists in the novel details of construction and combination of parts more fully hereinafter disclosed and particularly pointed out in the claims.

Referring to the accompanying drawings forming a part of this specification in which like numerals designate like parts in all the views:—

Figure 1 is an elevational view of an automobile radiator core detached from its suspension;

Fig. 2 is a diagrammatic view of an automobile radiator core surrounded by its suspension ready for attachment to the vehicle;

Fig. 3 is an enlarged partially sectional detail view of a portion of an automobile radiator core showing the construction of the parts and also one of the cut away corners of said core;

Fig. 4 is a perspective view of the improved suspension detached from the core; and Fig. 5 is a view showing the well known form of suspension now in use.

1 indicates one form of automobile radiator core suited to this invention and having the air cells 2, the water passages 3, the division plate 4 between contiguous rows of cells 2, and the plaits or other cell partitions 5 separating the individual cells and reaching to the division plate 4.

As is well known, in this type of radiator core the edges of the strips 9 from which the plaits 5 are formed are offset as at 6 and 7, to form water passages such as 3 between them.

The meeting surfaces 8 between the offsets 6 and 7 are soldered in place, thus forming seams; but even when the work is most carefully done, with the form of suspension heretofore employed, sudden racking strains engendered by the passage of the vehicle over rough roads, if of sufficient magnitude, are liable to open said surfaces or seams 8 in spots, and thus give rise to leaks.

Further the individual cell strips 9 as well as the division strips 4 are of necessity made from thin sheet metal. Accordingly, with the old style of suspension, they can be bent or displaced to a greater or less extent, under the influence of sufficiently heavy or sudden shocks or strains, that are encountered in the passage over rough roads. It follows that their meeting edges or lines of contact located between contiguous water passages being soldered together, as at 13, are in such cases liable to become separated, and thus still further injure the efficient operation of the radiator.

In order to secure the bottom tank 14 to the radiator core 1, it is customary to cut off the corners 15 and 16 of said core and to solder said tank 14 to said cut away corners as well as to the uncut portion 11 of said core 1, thus making said tank substantially rigid with said core along the broken line 12 all as will be clear from Figs. 2 and 5.

In the same way the top corners 17 and 18 of said core 1 are usually cut away and the top tank 19 soldered thereto and to the uncut portion 20 of said core along the broken line 21.

In the suspensions employed prior to this invention, the side reinforcing pieces 25 were further soldered as at 26 to their corresponding tanks such as 14, so that said reinforcing pieces and said tanks were rigidly secured by means of the solder 26 and 22, to the core 1, as best shown in Fig. 5.

The suspension brackets 27 are rigidly secured to the reinforcing pieces 25 as by means of the rivets or other fastenings 28, and therefore, under the old practice, when sudden strains or shocks are transmitted from the steel frame-work 29 of the automobile to the brackets 27, through said brackets to the reinforcing pieces 25, through said reinforcing pieces 25 to the solder 26, through said solder to the tanks such as 14 and 19 and to the solder 22, it is clear that bending or racking strains due to roughnesses of the road will be transmitted from the said tanks along the broken lines 12 and 21 to the core 1.

Not only under the old practice are the said racking strains transmitted directly from the steel frame work 29 to the core 1, but as will be seen from Figs. 3 and 5, the cut away corners such as 16, leave a number of ragged and irregular cut ends 30, 31, 32, 33, etc., of the strips, so that any severe bending of the ends through the solder 22, and especially any bendings in directions other than along a straight line, tend to put very complicated and severe racking strains on the entire interior construction of the core 1, thus greatly promoting the chance of developing leaks in use.

According to the invention now to be disclosed, however, the above objections are either entirely done away with or are greatly decreased. That is to say, instead of causing the racking and bending strains to be transmitted directly from the frame-work 29 to localized portions of the core such as those occupied by the solder 22, these said strains are distributed evenly all around the core by means of a hoop under tension which is not at any point rigidly attached to said core. In other words, according to the present invention, a hoop 40 having the side members 41 and 42, and the end members 43 and 44, is provided with tensioning members, and said hoop 40 therefore encircles under tension the tanks 14 and 19 as well as the core 1 without being rigidly attached to said tanks or core at any single point, all as will be clear from Fig. 2. Said hoop 40 is provided with the suspension brackets 27′ which are conveniently attached to the steel frame 29′ of the automobile as heretofore, and the members 41 and 44 are provided with the tensioning ears 45 and 46 respectively, through which adjusting bolts such as 47 may be passed, in order to adjust the tension of said hoop, all as will be clear from Fig. 2. No solder such as 26 or other rigid fastenings are had between the said hoop 40 and the tanks, or between the said hoop 40 and the core, and it therefore follows that when sudden strains or jolts are imparted to the said brackets 27′ or to the said tensioned hoop the said strains or jolts are transmitted to the said hoop around the entire structure whether the supporting members 27 are provided or not so that the tanks as well as the body portion of the core 1 are more evenly strained than heretofore, and thus local straining is avoided. Especially is this the case when one bracket 27′ is more suddenly raised or lowered than is the other, for in such cases under the old practice, the local straining was often very severe. Under this invention, on the other hand, such strains are taken circumferentially of the hoop under tension and it is possible for the strains to be distributed substantially all around the core even if no rigid connection with the frame such as 27 exist.

The brackets 50 aid in securing the outer casing not shown, to the hoop and framework while the flanges 51 aid the hoop in holding the core and tanks in place.

When desired cushioning members 52 of cork, rubber, leather, etc., may be employed at the corners of the hoop as indicated in dotted lines Fig. 4, but ordinarily such members need not be used.

What is claimed is:—

1. In an apparatus of the class described the combination of a cellular radiator core for automobiles; a tank associated with said core; and a hoop under tension surrounding said core and tank, substantially as described.

2. In an apparatus of the class described the combination of a radiator core; top and bottom tanks associated with said core; a hoop under tension surrounding said core and tanks; and means to adjust the tension of said hoop, substantially as described.

3. In an apparatus of the class described the combination of a radiator core; top and bottom tanks rigidly associated with said core; a detachable hoop adapted to be placed under tension surrounding said core and tanks; and means to adjust the tension of said hoop, substantially as described.

4. In an apparatus of the class described the combination of a cellular radiator core for automobiles; top and bottom tanks associated with said core; a readily detachable sectional hoop adapted to be placed under tension surrounding said core and tanks; and means to adjust the tension of said hoop, substantially as described.

5. In an apparatus of the class described the combination of a cellular radiator core for automobiles; a tank associated with said core; and a hoop under tension provided with suspension means surrounding said core and tank, substantially as described.

In testimony whereof we affix our signatures, in presence of two witnesses.

CHARLES CHRISTOPHER ROBERTS.
JOHN EDWARD BARCHEL.

Witnesses:
OLIVE F. MURPHY,
MARGUERITE E. ROGERS.